UNITED STATES PATENT OFFICE.

CHARLES SORLEY, OF NEW YORK, N. Y., ASSIGNOR TO THE ANGLO-AMERICAN ELECTRIC LIGHT MANUFACTURING COMPANY, OF WEST VIRGINIA.

METHOD OF PREPARING ACTIVE MATERIAL FOR SECONDARY BATTERIES.

SPECIFICATION forming part of Letters Patent No. 423,091, dated March 11, 1890.

Application filed November 12, 1889. Serial No. 330,054. (No specimens.)

*To all whom it may concern:*

Be it known that I, CHARLES SORLEY, of the city, county, and State of New York, have invented a new and useful Improvement in Methods of Preparing Active Material for Storage-Batteries, of which the following is a specification.

The object of my invention is to prepare the active material applied or introduced in the electrodes of a storage-battery in such a way that very little if any expansion will take place while in the battery.

I carry my method into practical effect as follows: I treat any active material—such as a lead oxide—with another substance—such as sulphuric acid—which is capable of determining in said active material the maximum amount of expansion which said material will undergo while in the electrolyte in the cell. I prefer, then, to subject the material so treated to heat until all moisture is expelled and it is thoroughly dry. I then crush or pulverize said material, in which condition it may be packed in any suitable support or plate to form an electrode for a storage-cell. The active material, having thus already been expanded in advance, undergoes no further expansion in the cell, and hence does not enlarge the recesses or openings in which it is held in the supports. Disintegration or tearing of the electrodes is thus obviated and their effective lifetime greatly increased.

While I have herein more particularly set forth the use of a fluid—such as sulphuric acid—for causing the expansion of the active material—such as a lead oxide—I do not desire to be understood as limiting myself to this particular means of effecting the expansion of an active material, but refer herein to an active material expanded in any known way, as and for the purpose set forth. Neither do I herein limit myself to the application of my said expanded active material in a dry state to the plates or supports, because after it has been treated in accordance with the method hereinbefore set forth it may, if desired, be mixed with a liquid to produce a paint, paste, or cement and then applied to said support; but I do not intend hereby to claim herein an active material prepared for use in the form of a paint, paste, or cement.

I claim—

1. Preparing active material for use in a secondary-battery electrode by subjecting an active material to the action of a fluid capable of expanding said material, and then drying said material prior to combining the same with said electrode, substantially as described.

2. Preparing active material for use in a secondary-battery electrode by subjecting an active material to the action of a fluid capable of expanding said material, then drying and then comminuting said material, substantially as described.

3. Preparing lead oxide for use in a secondary-battery electrode by treating the same with sulphuric acid to produce expansion, and then driving off the contained moisture by heat before applying said oxide to said electrode, substantially as described.

CHARLES SORLEY.

Witnesses:
S. O. EDMONDS,
PARK BENJAMIN.